United States Patent
Saito et al.

(10) Patent No.: US 6,627,692 B2
(45) Date of Patent: *Sep. 30, 2003

(54) LONG FIBER-REINFORCED POLYPROPYLENE RESIN COMPOSITION

(75) Inventors: Koichi Saito, Chiba (JP); Toshimori Nakai, Chiba (JP); Nobukazu Atsumi, Chiba (JP); Hideshi Ishiwa, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/985,287

(22) Filed: Nov. 2, 2001

(65) Prior Publication Data

US 2002/0091191 A1 Jul. 11, 2002

(30) Foreign Application Priority Data

Nov. 14, 2000 (JP) .......................... 2000-347149
Jul. 30, 2001 (JP) .......................... 2001-229879

(51) Int. Cl.$^7$ .......................... C08K 3/40; C08L 51/06; C08L 53/00
(52) U.S. Cl. .................. 524/494; 524/504; 524/505
(58) Field of Search ................. 524/494, 493, 524/847, 504, 505

(56) References Cited

U.S. PATENT DOCUMENTS

| | | | |
|---|---|---|---|
| 4,549,920 A | | 10/1985 | Cogswell et al. |
| 4,559,262 A | | 12/1985 | Cogswell et al. |
| 5,019,450 A | | 5/1991 | Cogswell et al. |
| 5,213,889 A | | 5/1993 | Cogswell et al. |
| 5,548,013 A | * | 8/1996 | Fujii et al. |
| 5,672,658 A | | 9/1997 | Oka et al. |
| 5,948,473 A | | 9/1999 | Saito et al. |
| 6,107,388 A | | 8/2000 | Sanpei et al. |
| 6,268,062 B1 | * | 7/2001 | DeMeuse .................... 428/461 |
| 6,284,831 B1 | * | 9/2001 | Shimpuku et al. .......... 524/494 |
| 6,323,298 B1 | * | 11/2001 | Yanagihara et al. ........ 526/351 |

OTHER PUBLICATIONS

Macromolecules 8, 687 (19975), vol. 8, No. 5. Sep.–Oct. 1975.

* cited by examiner

Primary Examiner—Tae H. Yoon
(74) Attorney, Agent, or Firm—McDermott, Will & Emery

(57) ABSTRACT

Provided are a long fiber-reinforced polypropylene resin composition and its moldings which have a high rigidity, impact resistance and durability, and especially have an extremely good repeated impact resistance and creep resistance, and are therefore suitable for various parts including automobile parts and other industrial parts. The long fiber-reinforced polypropylene resin composition comprises from 35 to 75% by weight of a matrix polymer and contains from 25 to 65% by weight of long glass fibers having a length of from 2 to 50 mm, in which the matrix polymer is a modified propylene homopolymer or a modified propylene-ethylene copolymer prepared by modifying a propylene homopolymer having an isotactic pentad fraction (P) of at least 96% and Mw/Mn (Q) of at most 6, or a crystalline propylene-ethylene copolymer composed of homopolymer segments having an isotactic pentad fraction (P) of at least 96% and Mw/Mn (Q) of at most 6 and propylene-ethylene copolymer segments, with an unsaturated carboxylic acid or its anhydride, or a mixture of the modified propylene homopolymer or propylene-ethylene copolymer and the non-modified propylene homopolymer or crystalline propylene-ethylene copolymer, and has a melt flow rate (230° C., 21.18 N) of at least 50 g/10 min. The resin composition is molded into moldings, optionally after diluted with a diluent of an ordinary propylene-based (co)polymer.

8 Claims, No Drawings

LONG FIBER-REINFORCED POLYPROPYLENE RESIN COMPOSITION

BACKGROUND OF THE INVENTION

1. Field of the Invention

The present invention relates to a long fiber-reinforced polypropylene resin composition and its moldings. Precisely, the invention relates to a long fiber-reinforced polypropylene resin composition and its moldings which have a high rigidity, impact resistance and durability and especially have extremely good repeated impact resistance and creep resistance, and are therefore suitable for various parts including automobile parts and other industrial parts.

2. Description of the Related Art

Long fiber-reinforced polypropylene resin compositions that are generally prepared by impregnating a continuous reinforcing long fiber bundles with a molten polypropylene resin, then pultruding it, and pelletizing it into pellets having a length of from 2 to 50 mm can be formed into good moldings having high mechanical strength and good impact resistance, and they are widely used, for example, for automobile parts and industrial parts. However, when the moldings are loaded with repeated shocks, their repeated impact resistance is unsatisfactory, and, in addition, their creep resistance at high temperatures is also unsatisfactory. At present, therefore, their applications are limited.

In International Patent Laid-Open No. WO/99/11708, proposed are automobile interior parts having improved surface scratch resistance, which are formed by molding a composition that comprises a crystalline propylene-ethylene copolymer composed of homopolymer segments having an isotactic pentad fraction (P) of at least 96% and Mw/Mn (Q) of at most 6 and propylene-ethylene copolymer segments, and contains ethylene-propylene copolymer rubber, talc and long glass fibers. As a result of our investigations, however, we, the present inventors have found that the rigidity, the impact resistance and the durability of the moldings proposed are not as yet satisfactory.

Not known at present, a long fiber-reinforced polypropylene resin composition capable of being formed into good moldings that have a high rigidity, impact resistance and durability and especially have more improved, repeated impact resistance and creep resistance is desired.

SUMMARY OF THE INVENTION

The object of the present invention is to provide a long fiber-reinforced polypropylene resin composition and its moldings, which solve all the inconveniences noted above and have a high rigidity, impact resistance and durability, especially having much improved repeated impact resistance and creep resistance, and which are therefore suitable to various parts including, for example, automobile parts and other industrial parts.

We, the present inventors have assiduously studied to solve the problems mentioned above. As a result, we have found that, when a modified propylene homopolymer or a modified propylene-ethylene copolymer which is prepared by modifying a specific propylene homopolymer or a specific crystalline propylene-ethylene copolymer with an unsaturated carboxylic acid or its anhydride, or a mixture which comprises the modified propylene homopolymer or the modified propylene-ethylene copolymer and the non-modified, specific propylene homopolymer or specific crystalline propylene-ethylene copolymer is used as a matrix polymer, and when a specific amount of the matrix polymer is mixed with a specific amount of glass fibers having a specific length, then the resulting, long fiber-reinforced polypropylene resin composition is extremely useful for solving the above-mentioned problems. On the basis of this finding, we have completed the present invention.

The present invention reside in following items:

(1) A long fiber-reinforced polypropylene resin composition, which comprises from 35 to 75% by weight of a matrix polymer and contains from 25 to 65% by weight of long glass fibers having a length of from 2 to 50 mm, and in which the matrix polymer is a modified propylene homopolymer or a modified propylene-ethylene copolymer prepared by modifying a propylene homopolymer having an isotactic pentad fraction (P) of at least 96% and Mw/Mn (Q) of at most 6, or a crystalline propylene-ethylene copolymer composed of homopolymer segments having an isotactic pentad fraction (P) of at least 96% and Mw/Mn (Q) of at most 6 and propylene-ethylene copolymer segments, with an unsaturated carboxylic acid or its anhydride, or a mixture of the modified propylene homopolymer or propylene-ethylene copolymer and the non-modified propylene homopolymer or crystalline propylene-ethylene copolymer, and has a melt flow rate (230° C., 21.18 N) of at least 50 g/10 min.

(2) The long fiber-reinforced polypropylene resin composition of above 1, wherein the crystalline propylene-ethylene copolymer is composed of homopolymer segments having an isotactic pentad fraction (P) of at least 96%, Mw/Mn (Q) of at most 6 and a hexane extraction of at most 0.8% by weight, and propylene-ethylene copolymer segments, and the modified propylene-ethylene copolymer is prepared by modifying the crystalline propylene-ethylene copolymer with an unsaturated carboxylic acid or its anhydride.

(3) A long fiber-reinforced polypropylene resin blend composition produced by blending the long fiber-reinforced polypropylene resin composition of any one of above 1 or 2, with a propylene homopolymer and/or a propylene-based block copolymer.

(4) Moldings of the long fiber-reinforced polypropylene resin composition of any one of above 1 or 2, or moldings of the long fiber-reinforced polypropylene resin blend composition of above 3.

DESCRIPTION OF THE PREFERRED EMBODIMENTS

From the viewpoint of improved rigidity, impact resistance and durability of the moldings of the resin composition of the invention, the starting polymer that gives the modified propylene homopolymer to be in the resin composition is a propylene homopolymer having an isotactic pentad fraction (P) of at least 96% and a ratio(Q) of weight-average molecular weight Mw/number-average molecular weight Mn of at most 6; and the starting polymer that gives the modified propylene-ethylene copolymer to be therein is a crystalline propylene-ethylene copolymer composed of homopolymer segments having an isotactic pentad fraction (P) of at least 96% and a ratio (Q) of weight-average molecular weight Mw/number-average molecular weight Mn of at most 6, and propylene-ethylene copolymer segments, preferably a crystalline propylene-ethylene copolymer composed of homopolymer segments having an isotactic pentad fraction (P) of at least 96%, a ratio(Q) of weight-average molecular weight Mw/number-average molecular weight Mn of at most 6 and a hexane extraction of at most 0.8% by weight, and propylene-ethylene copolymer segments.

The isotactic pentad fraction(P) referred to herein indicates the isotactic fraction of pentad units in the molecular chain of the polymer, and this can be measured through $^{13}$C-NMR, for example, according to Macromolecules 8, 687 (1975). The weight-average molecular weight Mw and the number-average molecular weight Mn of the polymer can be measured through gel permeation chromatography (GPC).

For the matrix polymer to be in the resin composition of the invention, usable is any of the above-mentioned propylene homopolymer and crystalline propylene-ethylene copolymer composed of homopolymer segments and propylene-ethylene copolymer segments (these are hereinafter referred to as propylene (co) polymers). From the viewpoint of the rigidity, the impact resistance and the durability of the moldings of the resin composition, however, preferred is the latter copolymer. More preferred is a crystalline propylene-ethylene copolymer composed of homopolymer segments having an isotactic pentad fraction (P) of at least 96%, Mw/Mn (Q) of at most 6 and a hexane extraction of at most 0.8% by weight, and propylene-ethylene copolymer segments.

Producing the propylene (co) polymers is not specifically defined, for which is employable any known method. One example of producing them comprises homopolymerizing propylene or polymerizing propylene followed by copolymerizing propylene with ethylene, in the presence of a high-stereospecificity catalyst such as that disclosed in Japanese Patent Laid-Open No. 269124/1996, concretely comprising a solid catalyst component that contains at least magnesium, titanium and halogen atoms and a polycarboxylate, along with an organoaluminum compound such as triethylaluminium, and an electron donor compound such as t-butyltriethoxysilane. In order to control the hexane extraction to fall within the range as above, slurry polymerization or copolymerization is preferred.

For producing the modified propylene homopolymer and the modified propylene-ethylene copolymer for use in the invention (these are hereinafter referred to as modified propylene (co)polymers), for example, employable is a method of melt-kneading 100 parts by weight of the starting polymer along with from 0.1 to 5 parts by weight of an unsaturated carboxylic acid or its anhydride and from 0.01 to 0.5 parts by weight of an organic peroxide.

Apart from this, also employable is a method of melt-kneading 100 parts by weight of the starting polymer along with from 1 to 10 parts by weight of a commercially-available modified propylene polymer that contains from 1 to 10% by weight of an unsaturated carboxylic acid or its anhydride introduced thereinto, and from 0.01 to 0.5 parts by weight of an organic peroxide; or a method of melt-kneading 100 parts by weight of a molten mixture that comprises 100 parts by weight of the starting polymer and from 0.01 to 0.5 parts by weight of an organic peroxide, along with from 1 to 10 parts by weight of a commercially-available modified propylene polymer that contains from 1 to 10% by weight of an unsaturated carboxylic acid or its anhydride introduced thereinto.

From the viewpoint of improved rigidity, impact resistance and durability of the moldings of the resin composition of the invention, the melt flow rate (230° C., 21.18 N; hereinafter referred to as MFR) of the modified propylene (co)polymers is preferably at least 50 g/10 min.

The unsaturated carboxylic acid and its anhydride include, for example, acrylic acid, methacrylic acid, maleic acid, nadic acid, fumaric acid, itaconic acid, maleic anhydride, nadic anhydride, and itaconic anhydride. From the viewpoint of easy reinforcement of the modified (co) polymer with glass fibers, preferred is maleic anhydride.

The modified propylene (co)polymers may be produced prior to the process of producing the long fiber-reinforced polypropylene resin composition (A) that is described in detail hereinunder, or may be produced in the process of melt-kneading the matrix polymer to give the long fiber-reinforced polypropylene resin composition (A).

The matrix polymer to give the long fiber-reinforced polypropylene resin composition (A) of the invention may be the modified propylene (co)polymer alone, or may be a mixture of the modified propylene (co)polymer and the non-modified, starting propylene (co)polymer. From the viewpoint of improved rigidity, impact resistance and durability of the moldings of the resin composition, it is desirable that the matrix polymer comprises, as the essential ingredient (in an amount of more than 50% by weight), the modified propylene (co)polymer, but more preferably, all the matrix polymer is the modified propylene (co)polymer alone. For examples of the non-modified propylene (co)polymer that may be in the matrix polymer, referred to are those mentioned hereinabove for the starting polymers to give the modified propylene (co) copolymers. In case where the matrix polymer is a mixture of the modified propylene (co)polymer and the non-modified propylene (co)polymer, it is desirable that the MFR of the mixture is at least 50 g/10 min.

The starting material for the long glass fibers having a length of from 2 to 50 μm to constitute the long fiber-reinforced polypropylene resin composition of the invention may be long glass fiber bundles, which are, for example, commercially-available glass rovings. In general, their mean fiber diameter falls between 4 and 30 μm; the number of filaments constituting one fiber bundle falls between 400 and 10,000; and the the tex yarn number count of one fiber bundle falls between 300 and 20,000 g/km. Preferably for use herein, the mean fiber diameter of the fiber bundles falls between 9 and 23 μm, and the number of filaments constituting one fiber bundle falls between 1,000 and 6,000. For enhancing their reinforcing ability, the fiber bundles are preferably treated with silane coupling agent on their surface. Thus processed, the fiber bundles enjoy good interlayer adhesion to resin.

For producing the long fiber-reinforced polypropylene resin composition, employable is any known method of melt pultrusion. Generally employed is a method in which a molten resin of the matrix polymer is fed from an extruder where it is prepared, into an impregnation die equipped at the top of the extruder, while long glass fiber bundles are passed through the die to thereby impregnate the fiber bundles with the molten resin, and the thus-impregnated fiber bundles are drawn out through a nozzle, and then pelletized into pellets having a length of from 2 to 50 mm. As so mentioned hereinabove, also employable is a method in which the propylene (co)polymer is dry-blended with an unsaturated carboxylic acid or its anhydride, and an organic peroxide, and the resulting blend is put into the hopper of the extruder. In this, the propylene (co)polymer is applied to long glass fiber bundles while it is modified.

For impregnating glass fiber bundles with the matrix polymer, any known method is employable so far as it ensures good resin impregnation. For example, employable is any of a method of letting glass fiber bundles on the surface a resin spreader while in contact with it under tension to thereby impregnating them with a molten resin (Japanese Patent Publication No. 37694/1988); or a method of letting glass fiber bundles through a pair of opening pins equipped in an impregnation die while not in contact with the pins to thereby impregnate them with a molten resin (International Patent Laid-Open No. WO97/19805) Of the two, preferred for the invention is the latter method as the fiber bundles impregnated therein are fluffed little while they are taken up at high speed.

The glass fiber content of the long fiber-reinforced polypropylene resin composition falls between 25 and 65% by weight, preferably between 35 and 55% by weight of the composition, from the viewpoint of improved rigidity, impact resistance and durability of the moldings of the composition. The long fiber-reinforced polypropylene resin composition may be directly molded as it is, but may be molded after diluted with any other propylene homopolymer and/or propylene-based block copolymer (B) not containing long glass fibers. For the propylene-based block copolymer that serves as the diluent (B), usable is a crystalline propylene-based block copolymer having a propylene content of at least 70% by weight and copolymerized with an α-olefin except propylene, for example, with ethylene, 1-butene, 1-pentene or the like. From the viewpoint of improved rigidity, impact resistance and durability of the moldings of the resin composition, preferred for the diluent is such a crystalline propylene-based block copolymer of which the homopolymer segments have an isotactic pentad fraction(P) of at least 96% and Mw/Mn (Q) of at most 6. The diluent (co)polymer may be in any form of pellets, granules, flakes and powders, and its morphology is not specifically defined. For it, however, preferred are pellets.

The long fiber-reinforced polypropylene resin composition may be dry-blended with the diluent (B). For making the reinforcing fibers keep their length in the blend composition and for further enhancing the stiffness, the impact resistance and the durability of the moldings of the composition, it is rather preferable that the composition is, after prepared by dry-blending the components, directly fed into a molding machine such as an injection-molding machine, not being let into an extruder. The blend ratio of the diluent (B) is determined, depending on the glass fiber content of the long fiber-reinforced polypropylene resin composition and on the glass fiber content of the final moldings of the composition, and may fall between 20 and 85% by weight from the viewpoint of improved rigidity, impact resistance and durability of the moldings. Apart from the diluent (B), any other additive of antioxidant, light stabilizer, UV absorbent and antistatic agent may be added to the resin composition, if desired.

For forming the long fiber-reinforced polypropylene resin composition or the blend composition into moldings, employable with no limitation is any known molding method of, for example, injection molding, extrusion molding, blow molding, compression molding or injection compression molding. For it, however, preferred is injection molding, compression molding or injection compression molding. The resulting moldings have many applications in various fields, and are especially favorable for automobile parts and other industrial parts.

EXAMPLES

The invention is described more concretely with reference to the following Examples and Comparative Examples, which, however, are not intended to restrict the scope of the invention.

<1> Isotactic Pentad Fraction (P):
Measured through $^{13}$C-NMR, according to *Macromolecules* 8, 687 (1975).
<2> Mw/Mn (Q):
A sample is dissolved in orthodichlorobenzene at 135° C., and analyzed through GPC, for which is used Waters' 150C Model equipped with a column of TSK GEL GMH6-HT.
<3> Total Ethylene Content (wt %):
Measured through infrared (IR) absorption spectrometry.
<4> Hexane Extraction:
2 g of a ground sample is set in a Soxhlet extractor, and extracted with hexane for 2 hours. From the weight of the sample measured before and after extraction, obtained is the hexane extraction of the sample.
<5> MFR:
Measured based on the test condition 14 in JIS-K7210.
<6> Flexural Modulus (Rigidity):
A sample is molded into test pieces of 100 mm×10 mm×4 mm, which are measured according to JIS K-7203.
<7> Repeated Impact Strength:
In a laboratory combination mold, a sample is molded into test pieces of 64 mm×13 mm×3.2 mm. Using an Izod impact tester, a hammer of 40 kgf-cm testing is repeatedly hit on the test piece at a lift-up angle of 75 degrees, and the number of hits to break the test piece is counted. The number of hits after which the test piece is broken indicates the repeated impact strength of the sample tested.
<8> Tensile Creep Strength:
In a laboratory combination mold, a sample is molded into #1 dumbbells of JIS K-7213. The dumbbells are subjected to a tensile test at a tensile speed of 50, 5, 0.5, 0.05, 0.005 or 0.0005 mm/min. The time at which the dumbbells are broken and the breaking stress are plotted on a graph (in which the time is in a logarithmic scale), and the thus-plotted points are extrapolated to obtain the value of stress under which the breaking time is 1000 hours. The thus-obtained stress value indicates the tensile creep strength of the sample.

Example 1

100 parts by weight of a crystalline propylene-ethylene copolymer (its homopolymer segments have a value P of 97.6%, a value Q of 5.2 and a hexane extraction of 0.6% by weight, and it has a total ethylene content of 6.5 wt %) was mixed with 0.5 parts by weight of maleic anhydride, 0.1 parts by weight of 2,6-di-t-butyl-paracresol, 0.1 parts by weight of calcium stearate, and 0.1 parts by weight of 2,5-dimethyl-2,5-di(t-butylperoxy) hexane. The resulting mixture was extruded out of an extruder set at 200° C. to prepare a modified propylene-ethylene copolymer having MFR of 120 g/10 min.

Glass rovings having a mean fiber diameter of 17 μm and a the tex yarn number count of 2310 g/km were let into an impregnation bath heated at 280° C., with a molten modified propylene-ethylene copolymer being let thereinto. After thus impregnated with the modified propylene-ethylene copolymer, these were drawn out through a circular nozzle having a diameter of 2.7 mm, cooled and then cut into pellets having a length of 10 mm. The thus-obtained, long fiber-reinforced polypropylene resin pellets had a glass fiber content of 40% by weight. The pellets were fed into a laboratory injection-molding machine. The cylinder temperature was 250° C. Thus let into the combination mold of the machine, the resin melt was molded into test pieces. Tested for their properties, these were all good. The test results are shown in Table 1.

Example 2

In the same manner as in Example 1, a long fiber-reinforced polypropylene resin composition was produced, molded and evaluated, for which, however, the starting polymer to give a modified propylene-ethylene copolymer was a crystalline propylene-ethylene copolymer, of which the homopolymer segments had a value P of 96.5% and a value Q of 5.5, and the total ethylene content of the copolymer was 6.9 wt %. Tested for their properties, the test pieces produced herein were all good. The test results are shown in Table 1.

Example 3

In the same manner as in Example 1, a matrix polymer, modified propylene-ethylene copolymer having MFR of 210 g/10 min was prepared, to which, however, added was 0.2 parts by weight of 2,5-dimethyl-2,5-di(t-butylperoxy) hexane. Using the thus-prepared, modified propylene-ethylene copolymer, a long fiber-reinforced polypropylene resin composition was produced, molded and evaluated also in the same manner as in Example 1. Tested for their properties, the test pieces produced herein were all good. The test results are shown in Table 1.

Comparative Example 1

In the same manner as in Example 1, a long fiber-reinforced polypropylene resin composition was produced, molded and evaluated, for which, however, the starting polymer to give the modified propylene homopolymer was a propylene homopolymer having a value P of 95.0%, a value Q of 5.7 and a hexane extraction of 0.5% by weight. In this, the value P of the polymer used was outside the scope of the invention, and the properties of the test pieces produced and tested were all not good.

Comparative Example 2

In the same manner as in Example 1, a long fiber-reinforced polypropylene resin composition was produced, molded and evaluated. For this, however, the starting polymer to give the modified propylene-ethylene copolymer was a crystalline propylene-ethylene copolymer, of which the homopolymer segments had a value P of 95.2%, a value Q of 5.6 and a hexane extraction of 1.2% by weight, and which had a total ethylene content of 6.4%. In this, the value P and the hexane extraction of the starting polymer used were both outside the scope of the invention, and the properties of the test pieces produced and tested were all not good.

Comparative Example 3

In the same manner as in Example 1, a long fiber-reinforced polypropylene resin composition was produced, molded and evaluated, for which, however, the starting polymer to give the modified propylene homopolymer was a propylene homopolymer having a value P of 96.7%, a value Q of 8.3 and a hexane extraction of 1.0% by weight. In this, the value P of the polymer used was within the scope of the invention but the value Q thereof was not. Though the flexural modulus of the test pieces produced and tested herein was good, the other properties thereof were not good.

Example 4

In the same manner as in Example 1, a long fiber-reinforced polypropylene resin composition was produced, for which, however, the resin-impregnated glass rovings were drawn out through a circular nozzle having a diameter of 2.0 mm. The glass fiber content of the resin composition thus produced herein was 60% by weight. The long fiber-reinforced polypropylene resin composition was dry-blended with a diluent, crystalline propylene-ethylene block copolymer, in a blend ratio of 50/50% by weight to give a long fiber-reinforced polypropylene resin blend composition finally having a glass fiber content of 30% by weight. The homopolymer segments of the diluent, block copolymer used herein had a value P of 96.4%, a value Q of 5.6 and a hexane extraction of 0.7% by weight, and the total ethylene content of the diluent, block copolymer was 6.4% by weight. Also in the same manner as in Example 1, the resin blend composition was molded and evaluated. Tested for their properties, the test pieces were all good. The test results are shown in Table 1.

TABLE 1

|  |  |  |  | Ex.1 | Ex.2 | Ex.3 | Co.Ex.1 | Co.Ex.2 | Co.Ex.3 | Ex.4 |
|---|---|---|---|---|---|---|---|---|---|---|
| Modified | Stsrting | P | % | 97.6 | 96.5 | 97.6 | 95.0 | 95.2 | 96.7 | 97.6 |
| Propylene | Polymer | Q |  | 5.2 | 5.5 | 5.2 | 5.7 | 5.6 | 8.3 | 5.2 |
| (co)polymer |  | total ethylene content | % | 6.5 | 6.9 | 6.5 | — | 6.4 | — | 6.5 |
|  |  | hexane extraction | % | 0.6 | 0.7 | 0.6 | 0.5 | 1.2 | 1.0 | 0.6 |
|  | MFR |  | g/10 min | 120 | 120 | 210 | 140 | 140 | 130 | 120 |
| Glass Fiber Content of (A) |  |  | wt. % | 40 | 40 | 40 | 40 | 40 | 40 | 60 |
| Blend Ratio |  | (A) | wt. % | 100 | 100 | 100 | 100 | 100 | 100 | 50 |
|  |  | (B) | wt. % | — | — | — | — | — | — | 50 |
| Glass Fiber Content of Final Composition |  |  | wt. % | 40 | 40 | 40 | 40 | 40 | 40 | 30 |
| Evaluation | Flexural Modulus |  | MPa | 7840 | 7760 | 7870 | 6900 | 6310 | 7790 | 6040 |
|  | Repeated Impact Strength |  | Number of hits | 113 | 125 | 109 | 37 | 64 | 39 | 86 |
|  | Tensile Creep Strength |  | MPa | 106 | 102 | 110 | 75 | 54 | 81 | 82 |

As described in detail hereinabove with reference to its preferred embodiments, the moldings of the long fiber-reinforce polypropylene resin composition of the invention, which comprises a specific polymer serving as a matrix polymer, have a high rigidity, impact resistance and durability, and especially have extremely good repeated impact resistance and creep resistance. The moldings have many applications in various fields, and are especially favorable to automobile parts and other industrial parts.

What is claimed is:

1. A long fiber-reinforced polypropylene resin composition which comprises from 35 to 75% by weight of a matrix polymer and from 25 to 65% by weight of long glass fibers of from 2 to 50 mm in length, the matrix polymer comprising:
 a modified propylene-ethylene copolymer prepared by modifying a crystalline propylene-ethylene copolymer with an unsaturated carboxylic acid or its anhydride,
 the crystalline propylene-ethylene copolymer containing propylene homopolymer segments and propylene-ethylene copolymer segments, the propylene homopolymer segments having an isotactic pentad fraction of at least 96%, Mw/Mn of at most 6 and a hexane extraction of at most 0.8% by weight, and the modified propylene-ethylene copolymer has a melt flow rate (230° C., 21.18 N) of at least 50 g/10 mm.

2. A long fiber-reinforced polypropylene resin composition according to claim 1, wherein the matrix polymer further includes a non-modified crystalline propylene-ethylene copolymer.

3. A long fiber-reinforced polypropylene resin blend composition by dry-blending the long fiber-reinforced polypropylene resin composition of claim 1 with a propylene homopolymer and/or a propylene-based block copolymer.

4. A long fiber-reinforced polypropylene resin blend composition by dry-blending the long fiber-reinforced polypropylene resin composition of claim 2, with a propylene homopolymer and/or a propylene-based block copolymer.

5. A molding of the long fiber-reinforced polypropylene resin composition of claim 1.

6. A molding of the long fiber-reinforced polypropylene resin blend composition of claim 3.

7. A molding of the long fiber-reinforced polypropylene resin composition of claim 2.

8. A molding of the long fiber-reinforced polypropylene resin blend composition of claim 4.

* * * * *